(12) United States Patent
Langer

(10) Patent No.: US 8,819,111 B2
(45) Date of Patent: Aug. 26, 2014

(54) METHOD AND SYSTEM FOR NOTIFYING AN ADDRESSEE OF A COMMUNICATION SESSION

(75) Inventor: Moshe Langer, Gimzo (IL)

(73) Assignee: Flash Networks, Ltd, Herzliya (IL)

( * ) Notice: Subject to any disclaimer, the term of this patent is extended or adjusted under 35 U.S.C. 154(b) by 1263 days.

(21) Appl. No.: 12/102,187

(22) Filed: Apr. 14, 2008

(65) Prior Publication Data

US 2008/0281905 A1 Nov. 13, 2008

Related U.S. Application Data

(60) Provisional application No. 60/916,311, filed on May 7, 2007.

(51) Int. Cl.
*G06F 15/16* (2006.01)
*H04L 29/08* (2006.01)
*H04L 12/58* (2006.01)
*H04L 29/06* (2006.01)
*H04L 12/66* (2006.01)

(52) U.S. Cl.
CPC .............. *H04L 65/605* (2013.01); *H04L 67/28* (2013.01); *H04L 12/581* (2013.01); *H04L 67/14* (2013.01); *H04L 67/2823* (2013.01); *H04L 65/1083* (2013.01); *H04L 12/587* (2013.01); *H04L 67/02* (2013.01); *H04L 51/04* (2013.01); *H04L 12/5895* (2013.01); *H04L 12/66* (2013.01); *H04L 67/2876* (2013.01); *H04L 51/24* (2013.01)
USPC ........... 709/203; 709/202; 709/207; 709/227; 709/230; 379/265.02; 379/265.09

(58) Field of Classification Search
None
See application file for complete search history.

(56) References Cited

U.S. PATENT DOCUMENTS

| | | | |
|---|---|---|---|
| 6,223,046 B1 | 4/2001 | Hamill-Keays et al. | |
| 6,564,261 B1* | 5/2003 | Gudjonsson et al. | 709/227 |
| 7,110,773 B1 | 9/2006 | Wallace et al. | |
| 2002/0004819 A1* | 1/2002 | Agassy et al. | 709/203 |
| 2002/0181694 A1* | 12/2002 | Mani | 379/373.02 |
| 2002/0194331 A1* | 12/2002 | Lewis et al. | 709/224 |
| 2003/0217109 A1* | 11/2003 | Ordille et al. | 709/206 |
| 2005/0254464 A1 | 11/2005 | Patel et al. | |

FOREIGN PATENT DOCUMENTS

| | | |
|---|---|---|
| EP | WO2005099216 A1 | 10/2005 |
| SE | WO0036859 A1 | 6/2000 |

\* cited by examiner

*Primary Examiner* — Patrice Winder
*Assistant Examiner* — Nam Tran
(74) *Attorney, Agent, or Firm* — Smith Risley Tempel Santos LLC; Gregory Scott Smith

(57) ABSTRACT

Requests for communications and for establishing communication sessions with an intended addressee are detected and notifications regarding the pending communication request are provided to the intended addressee. If the addressee is operating on-line in an IP environment, the messages are delivered to the addressee via a real-time mechanism. However, if the addressee is not operating on-line in an IP environment, a message is sent via an alternate means, such as SMS, email etc. For on-line addressees, if the addressee is presently running an application program, the type of application program can be ascertained and the notification message can be compatible with the rendering functions of the application program.

16 Claims, 3 Drawing Sheets

METHOD AND SYSTEM FOR NOTIFYING AN ADDRESSEE OF A COMMUNICATION SESSION

CROSS-REFERENCE TO RELATED APPLICATIONS

This application is a U.S. Nonprovisional Application for Patent filed under 37 CFR 1.53(b) and claiming priority to, and the benefit of, U.S. Provisional Application for Patent filed on May 7, 2007 and assigned Ser. No. 60/916,311, which application is hereby incorporated by reference.

BACKGROUND

The present invention relates to the field of data communication and, more particularly, to a system and method for improving quality of experience (QoE) for real-time communication over an IP network.

The Internet is an increasingly popular and important medium for data communication. Recently, real-time communication applications, such as voice over IP (VoIP), video conferencing and instant messaging have greatly increased in popularity. It seems that the share of real-time sessions conducted over the IP (Internet Protocol) out of the bandwidth capacity of a common operator's network is continuously increasing and captures a significant portion of the bandwidth.

One of the shortcomings of real-time communication utilizing the IP is the absence of notification tools. In some cases, a destination (an addressee) of a real-time impromptu call (audio, video or instant messaging) cannot be notified. For example, a user who is currently surfing the internet via his or her cellular telephone, cannot be notified that a real-time call over IP is waiting to be answered or is currently being received.

Therefore, there is a need in the art for a system and a method for informing a user that an IP based real-time impromptu call is waiting or incoming. Such a system can improve the quality of experience for real-time communication consumers.

BRIEF SUMMARY

This disclosure describes systems and methods for notifying an addressee that an impromptu IP real-time call is incoming and/or waiting. The IP real-time call can be a VoIP call, a video conference call, an instant message, etc. An exemplary embodiment of the invention is operable to identify a current application that is being used by the addressee and then to create a notification message that matches the application that is being used by the addressee. The notification message can be delivered to the user by embedding the message within the data traffic that is targeted toward the user. The received notification message is parsed by the current application being used by the recipient addressee and is then presented to the addressee.

The notification message can be presented to the addressee in a variety of manners, and may be presented in a manner that is dependent upon the current activity of the addressee. For instance, if the addressee is engaged in surfing the Internet when the incoming call or message is detected, then the notification message can be an HTTP object informing the addressee that an IP real-time call is waiting. An exemplary object can be a popup message, a banner etc. The message can include instructions on how to respond to the real-time call. In addition, a link to the server that serves the real-time call can be added to the notification message as a means of providing access to the call. Additionally, if the addressee is engaged in the act of viewing a video stream or participating in video communication session when the incoming call or message is detected, then the notification message can be embedded within the video content. The video notification message can inform the addressee that an IP real-time call is waiting. The message can include instructions how to respond to the real-time call. Likewise, the notification can be audio, text or a combination of video, audio, text, animation hyperlinks and markup language depending on the application. Thus, in essence the typical notification message is formatted such that it can be rendered by the currently used application program.

One embodiment of the present invention includes an apparatus or device that can be interfaced or embedded within a node existing between a terminal and a server. Typically, the communication between the terminal and server that passes through the apparatus, or that is accessible to the apparatus is in an IP format. Based on the content of this data, the notification message can be generated. The apparatus detects when the data includes a request to establish communication and, in a typical embodiment, the request is for a real-time bi-directional communication session.

One embodiment of the present invention is suitable for installation within a service provider premises (SPP). The service provider can be a telecom carrier, such as but not limited to, a cellular service provider, a satellite communication service provider, a Public Switched Telephone Network (PSTN) carrier, an access network service provider, etc. Other exemplary embodiments of the present invention can be installed in an Internet Service Provider (ISP) premises, for example.

Another exemplary embodiment of the present invention is suitable for installation as a QoE improver server in a node along the path between the user and a network such as the Internet. For example, an embodiment of the present invention can be installed at a service provider's premises beyond an access gateway to intercept the data communication traveling to and from the users. Exemplary embodiments of the present invention can be transparent to the user's devices.

An exemplary embodiment of the present invention may intercept requests to establish an IP real-time communication session over IP—such requests being sent to and/or from the users. An exemplary embodiment of the present invention parses data traffic that is based on real-time communication protocols, searching for a request to start a real-time session. Exemplary real-time communication protocols can include, but are not limited to, Session Initiation Protocol (SIP); Push-To-Talk Over Cellular (PTTOC), which is based on SIP, etc. The request can be analyzed in order to define the addressee. The addressee can be identified based on a destination IP address, MS-ISDN, etc., which is associated with the request.

Alternatively or additionally, a client application can be installed at a subscriber of the QoE improver server. The client application can create a unique request message for establishing an IP real-time session with an addressee. The request can be targeted toward the QoE improver server using a dedicated destination IP address, for example. In some embodiments of the present invention, a request form can be downloaded, by a user who wishes to make the real-time call, from a known link of QoE improver server.

Furthermore, one or more real-time servers, such as but not limited to a SIP Proxy/Server, can be configured to communicate with the QoE improver server. The real-time server can be configured to send a request to the QoE improver server requesting it to notify an addressee that a real-time call is waiting.

After defining an addressee, the users that are currently served by the QoE improver server are analyzed for determining whether the addressee is currently connected to the Internet. The analysis can be based on a served-users table. Each entry in the served-users table can be associated with a user that is currently communicating over an IP network. An entry can define the user ID, (e.g., an MS-ISDN, an IP address, etc.) and the type of session in which the user participates, etc. In an alternate embodiment of the present invention, an entry in the served-users table can include fields for defining user preferences. A user may have the option to upload user preferences. For example, the user preferences can indicate that the user is not to be interrupted during a video session.

If the addressee is not connected over an IP network, then an SMS message can be sent toward the addressee's device. The SMS message can inform the addressee that a real-time call is waiting and provide instructions regarding how to receive the call.

An exemplary embodiment of the present invention generate a feedback message that can be sent to a requesting device (a requester), which is the source of the request. The feedback message may inform the requester about the current activity of the addressee, as well as provide information regarding the notification message that was sent to the addressee.

Yet an alternate embodiment of the present invention may use an invitation application that can be used by users of the QoE improver server. The invitation application can be deployed within the browser application of the user device upon connecting to the QoE Improver Server (QoEIS). The invitation application can be used to prompt a requester to define setting parameters of a requested real-time call. Setting parameters can include a requester ID number, destination user ID number, session type, IP address of a server that is used for hosting the session, etc. In response to receiving the setting parameters, the invitation application can send feedback information about the notification that was sent to a destination user. In such an embodiment of the present invention, a requesting message, which is created by the invitation application, may initiate the notification process at the QoEIS.

Other objects, features, and advantages of the present invention will become apparent upon reading the following detailed description of the embodiments with the accompanying drawings and appended claims.

DETAILED DESCRIPTION OF THE INVENTION

The present invention, as well as features and aspects thereof, is directed towards providing message arrival, pending or waiting notifications to intended recipients in a variety of manners. One aspect of the invention is to identify a current activity of the intended recipient and then to deliver a notification message to the intended recipient based on that activity. For instance, if the intended recipient is surfing the web, the notification can be embedded within delivered web content, if the intended recipient is viewing a video stream or audio stream, the notification can be embedded within the stream, if the user is engaged in an instant message system, a blog, a telephone call, a chat room, etc., the operational state of the intended recipient can be ascertained and a notification message can be delivered commensurate with that state. Another aspect of the invention is examining packets delivered towards the intended recipient to help identify the operational state of the intended recipient and thus, determine the type of notification to provide. Another aspect of the invention is to hold delivery of the notification if the intended recipient is off-line or not accessible and either deliver the notification using an alternate, off-line means such as email, SMS, etc., or upon detecting on-line activity of the intended recipient, such as within a threshold period of time from the receipt of the communication, then deliver the notification.

Turning now to the figures in which like numerals represent like elements throughout the several views, exemplary embodiments of the present invention are described. For convenience, only some elements of the same group may be labeled with numerals. The purpose of the drawings is to describe exemplary embodiments and not for production. Therefore features shown in the figures are chosen for convenience and clarity of presentation only.

Figure 1:
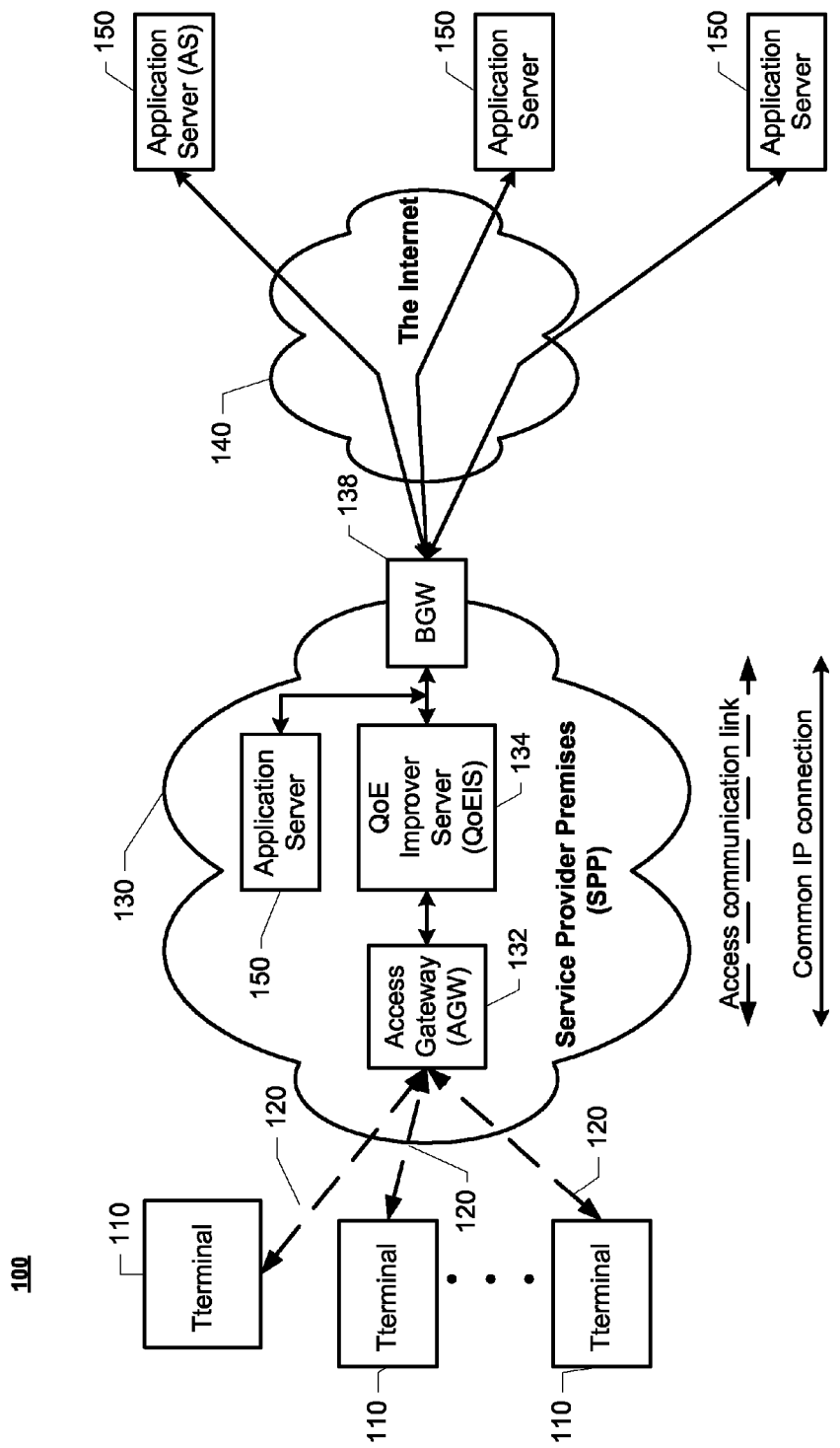
FIG. 1 illustrates a block diagram of an exemplary communication system that implements an exemplary embodiment of the present invention.

FIG. 1 depicts a block diagram with relevant elements of an exemplary communication system 100 that is a suitable environment for implementing exemplary embodiments of the present invention. The communications system 100 may be based on a cellular data communication network, satellite network, access network, Internet Service Provider (ISP) wireless network, or other type of network or communication system. Within the context of this description, the terms cellular, satellite, wireless, and ISP may be used interchangeably and at times, may have the same meaning.

Communication system 100 may comprise a plurality of terminals 110; a service provider premises (SPP) 130, a network 140 such as but not limited to the Internet; and one or more Application Servers 150 inside the SPP or outside the SPP 130. An exemplary SPP 130, among other elements, may comprise an access gateway (AGW) 132, a QoE improver server (QoEIS) 134 and a border gateway (BGW) 138.

It will be appreciated by those skilled in the art that depending upon its configuration and the needs, communication system 100 may comprise more than four Application Servers 150 and three of the terminals 110. However, for purposes of simplicity of understanding, three units of each are shown. It should be noted that the terms "terminals" "endpoint computer", "endpoint", "surfer", "user's device", "mobile phone" and "user" may be used interchangeably herein.

Communication system 100 is based on the Internet Protocol (IP) and it may represent one or more networks segments, including but not limited to, one or more Internet segments, one or more Intranets, etc. Communication system 100 may run over one or more types of physical networks, such as but not limited to, Public Switched Telephone Network (PSTN), Integrated Services Digital Network (ISDN), Cellular network, satellite, etc. Communication system 100 may run over a combination of those networks. System 100 may include intermediate nodes along the connection between a user and an application server. The intermediate nodes may include, but are not limited to, IP service provider servers, cellular service provider servers and other types of service provider equipment.

A plurality of endpoint computers 110 may be served by the computer system 100 for conducting real-time sessions via SPP 130, Internet 140 and application servers 150. A common terminal 110 may run a real-time communication application, via one of the application servers 150 for establishing a real-time session. An exemplary real-time communication application can be SIP, PTTOC, Skype, Google Talk, and MSN Messenger as non-limiting examples. Exemplary terminal 110 can be a personal computer (PC), a notebook computer, a cellular telephone, a handheld computer, a personal data assistant (PDA), or any other computing device with wire or wireless communication capabilities, etc.

The plurality of terminals 110 are connected via data links 120 to the Access Gateway (AGW) 132 within the SPP 130. The connection between the terminals 110 and the SPP 130 may be via intermediate nodes (such as a base station etc), not shown in FIG. 1. The AGW 132 acts as an access gateway between the network protocol that is used over communication links 120 and IP network that is used over the SPP 130. An exemplary AGW 132 may be a Remote Access Server (RAS), Gateway GPRS Support Node (GGSN), Packet Data Serving Node (PDSN), or any other similar node.

Border Gateway (BGW) 138 is the interface between the Internet 140 and the SPP 130. BGW 138 may route the upload communication toward the appropriate destination over network 140. When the upload transportation is a request for a real-time session, the BGW 138 routes the request to the appropriate application server 150. The terms BGW and the Border Router may be used interchangeably throughout this description. In the download direction, the BGW 138 receives incoming packets from the different application servers 150 and distributes them to the appropriate modules of the SPP 130. Usually packets that are targeted toward a terminal 110 are transferred to the AGW 132.

An exemplary embodiment of the QoEIS 134 can intercept traffic communicated between the AGW 132 and the BGW 138. Therefore, packets that are transferred between the plurality of endpoint computers 110 and the plurality of application servers 150 are received and processed by the QoEIS 134. In one exemplary embodiment, the QoEIS 134 may be configured as the default gateway for both sides of the SPP 130, (i.e., for AGW 132 and for the BGW 138). In another exemplary embodiment, the QoEIS 134 may physically reside between the AGW 132 and the BGW 138. In both cases, the QoEIS 134 may be transparent to both sides of the connection, to the endpoint computer 110 or to the application servers 150. In an alternate exemplary embodiment of the present invention the QoEIS 134 may be used as a non-transparent proxy, for example. In such a case, terminals 110 can be configured to include the QoEIS 134 as their proxy, for example. In another exemplary embodiment of the present invention, the QoEIS 134 can be configured as a transparent proxy. Such an embodiment may use redirection and IP-masquerading methods.

An exemplary QoEIS 134 can be adapted to intercept the transportation between the users 110 and the application servers 150. The traffic is analyzed and a relevant entry in a served-user table is updated with the current status of each connected user. When a request to establish a real-time communication session with one or more of the users of the QoEIS 134 (an addressee of the request) is received, the QoEIS 134 is capable of determining, whether the addressee of the request is currently connected to the Internet 140 and what type of application is being used by the addressee. A notification message can be created, informing the addressee that a real-time call is waiting. The notification message can include connection instructions for the addressee. The request can be received from one of the application servers 150 or from one of the users 110, and be intercepted and parsed by the QoEIS 134.

The notification message depends on the type of application that is used by the addressee. If the addressee is currently surfing the Internet a notification object can be added to a web page that is sent to the addressee. The notification object can be in the form of a popup message, a banner, etc. If the addressee is involved in an instant messaging session, the notification can be added to a next message that is sent to the addressee. If the addressee is in the middle of a video session, the message can be added to the video content in a variety of manners, including as an icon, a graphic, a subtitle, etc. If the addressee is not connected the notification can be sent by SMS, for example. More information on the operation of the QoEIS 134 is depicted below in conjunction with FIGS. 2. and 3.

Figure 2:
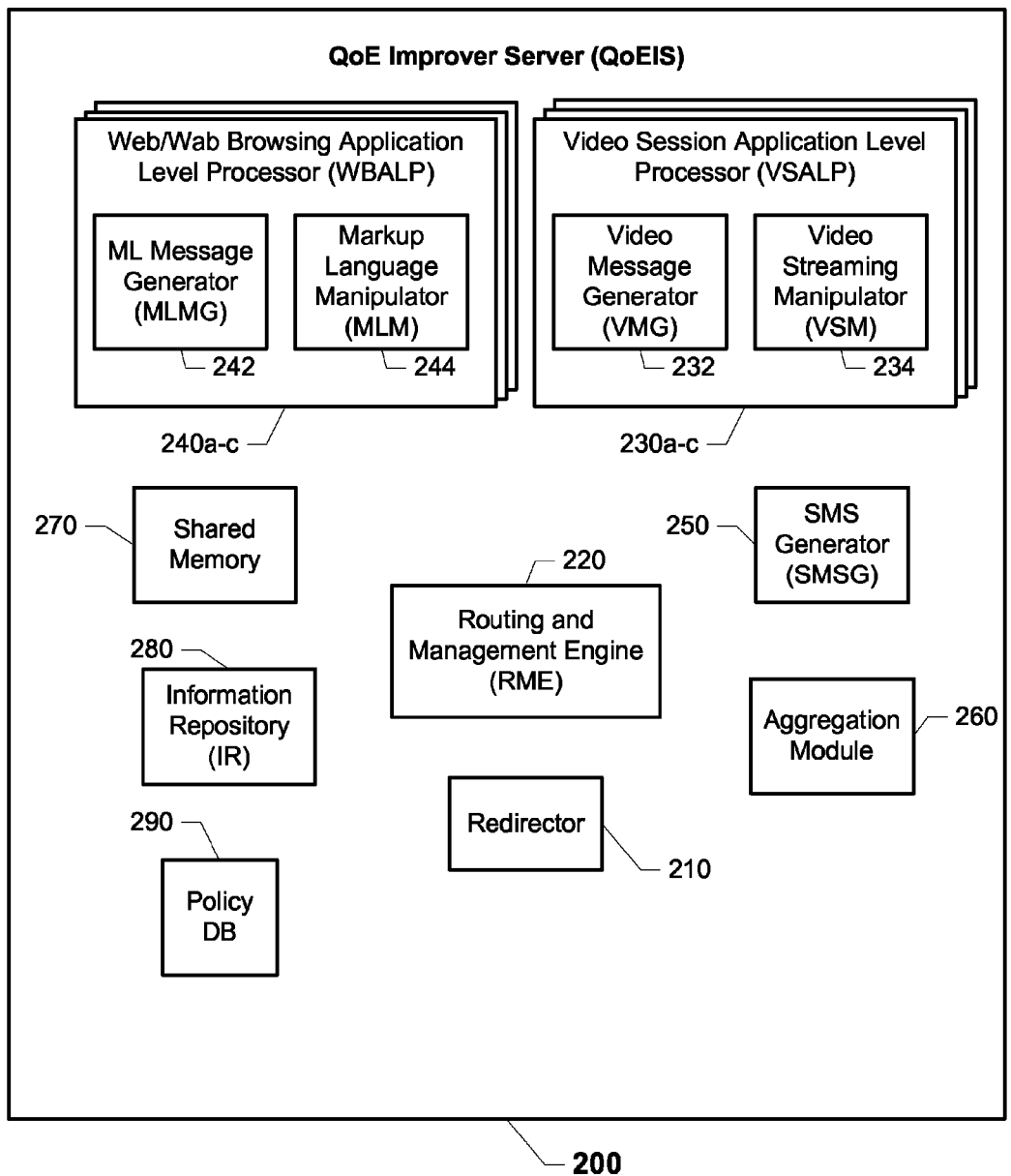
FIG. 2 illustrates a block diagram of relevant software modules of an exemplary embodiment of the present invention.

FIG. 2 is a block diagram with relevant elements of a QoE improver server (QoEIS) 200 that operates according to an exemplary embodiment of the present invention. The QoEIS 200 may be associated with an SPP 130 (FIG. 1) as an intermediate node 134 between the AGW 132 and the BGW 138. Within the context of the Open System Interconnection (OSI) Reference Model seven layer communication stack, an exemplary QoEIS 200 can be implemented by a module on top of the data link layer. An exemplary embodiment of the QoEIS 200, among other applications, can be operative to create notification messages about waiting real-time calls. Non-limiting examples of other applications that can be executed by the QoEIS 200 include acceleration, bandwidth management, etc. An exemplary embodiment of the QoEIS 200 can be transparent to both sides of the connection to the endpoints 110 and to the Internet 140 or SPP 130. An exemplary QoEIS 200 may comprise a redirector 210, a routing and management engine (RME) 220, an SMS generator (SMSG) 250, an aggregation module 260, a shared memory 270, an information repository (IR) 280 and a Policy data base 290.

In addition the QoEIS 200 can comprise one or more types of application level processors (ALP). Exemplary types of ALP can include video session application level processors (VSALP) 230a-c and Web/Wab browsing application level processor (WBALP) 240a-c, for example. Other exemplary QoEIS 200 can be configured to include other combinations of ALP. Additional types of ALP can be added or removed from a QoEIS 200. For example, an instant messaging application level processor (IMALP), not shown in the drawing, can be added. Each type of ALP can have one or more threads—one per each current user 110 that is currently communicating via QoEIS 200. It will be appreciated by those skilled in the art that depending upon its configuration and the needs, the QoEIS 200 may comprise more than two types of ALP and each type may have more than three of threads. However, for purposes of simplicity of understanding, two types of ALPs with three threads for each are shown.

The redirector 210 obtains packets coming to/from the plurality of endpoint computers 110 (FIG. 1) from/to the Internet (140) and redirects the packets to the internal modules of QoEIS 200. In addition the redirector 210 maintains the connections that were initiated by the users and maintains the IP addresses of packets going toward the users and the Internet 140 and/or SPP 130. Exemplary redirector can implement NAT modules. Other embodiments of the QoEIS 200 can comprise a commercial redirector, such as but not limited to, a Content Inspection Director (CID) (a product of Radware Ltd, Israel). Packets from redirector 210 are transferred to RME 220.

An exemplary RME 220 may parse one or more levels of the header of received packets, and based on the IP addresses and type of payload, may determine how to process the received packet. Accordingly, the packet can be routed toward one of the ALPs 230*a-c* or 240*a-c*, to aggregation module 260, or back to the redirector 210. Routing the packets between internal modules of the QoEIS 200 can be done via shared memory 270. The RME 220 may utilize the IR 280 and relevant policies from policy DB 290, in order to reach a decision regarding how to route a received packet. In addition, a served-users table can be managed and used by the RME 220. The served-users table can be stored in the shared memory 270. Each entry in the served-users table can be associated with a current connected user and contains information about the associated user, which is relevant for RME 220. Non-limiting examples of this information may include the user's IP address, MS-ISDN, an associated ALP if it has been already allocated, some user's preferences (if any exist), etc. In other exemplary embodiment of the present invention, the RME 220 can comprise a deep packet inspection (DPI) module, a Deep Packet Analyzer (DPA) and a policy enforcer.

Furthermore, if a received packet is a request to establish a real-time session, the request can be further analyzed and information on the addressee, the type of real-time session and a link for responding to the request can be retrieved. The RME 220 can search the served-users table looking for an entry that is associated with the addressee. If an entry is found, the content of the entry is parsed and accordingly a decision is made whether to transfer information about the requested real-time session to an appropriate ALP or to the SMSG 250 or back to the redirector 210. Additionally, the RME 220 may create and sent a feedback message to the requester informing him about the action that was taken.

If a received packet is a request from a subscriber of the QoEIS 200 to establish a new session over the Internet, a relevant ALP can be invoked or created by the RME 220. For example, if a packet is a request from a browser application of a new user, a WBALP 240 can be added and be associated with the new user, a new entry in the served-users table can be created and information about the new user and the associated ALP can be written in the relevant fields. In addition, the IR 280 and the policy DB 290 can be search for retrieving information that can be relevant to the user.

Shared memory 270 is used as an interface between the different modules of the QoEIS 200 and for storing the served users table. Each one of the modules of the QoEIS 200 may have a queue in the shared memory 270. Transferring information between the different modules can be done by placing a pointer to the information in a queue that is associated with the destination module. The IR 280 can store information that is related to users of the QoEIS 200. Information such as MS-ISDN, preferences, level of services, cellular telephone number, IP address, etc. The policy DB 290 may store policies that are relevant to the types of treatments to be executed on received packets. An exemplary policy can define priorities, maximum delay, etc.

The SMSG 250 can be used as an off-line notification module that can be used when the intended recipient of the real-time communication is currently not active over the internet. It can receive information about a request for a real-time session. Non-limiting examples of the received information can include the name of the requester and contact information for establishing the real-time session (a link to one of the application servers 150). In addition, information about the addressee, such as the MS-ISDN and/or IP address may be delivered. Based on the received information, the SMSG 250 can create an SMS message with information about the session. The SMS message and the addressee's MS-ISDN can be delivered to an associated SMS Center (SMSC), which resides in the operator's premises 130 (the SMSC is not shown in the drawing).

Another exemplary embodiment of the present invention may use another embodiment of an off-line notification module instead of SMSG 250. The other exemplary off-line notification module can be an IVR module that generates an audio message. Then, the off-line notification module can dial to a telephone of the intended recipient and performs the audio message.

The aggregation module 260 can receive and temporarily store packets coming from the RME 220. Packets from the aggregation module 260 can be delivered toward the redirector 210 to be sent toward their destination. The storage period in the aggregation module 260 can depend on an appropriate policy. The period can be a function of the load over the communication links, the type of payload, user type, etc.

Upon identifying a request from a new user, an exemplary ALP, such as WBALP 240*a-c* or VSALP 230*a-c* can be created or invoked by the RME 220. The type of ALP depends on the type of the session that is requested by the user. For example, if the request is for browsing the Internet, then a WBALP 240 can be added. If the request is for a video streaming session a VSLAP 230 can be added. If the request is for instant messaging session, an instant messaging ALP (IMALP) will be created (not shown). Among other modules each ALP can comprise a payload manipulator (a content manipulator) 244 or 234 (for example). The payload manipulator can be used for manipulating the traffic in order to accelerate the response and/or reduce bandwidth and/or add advertisements, etc.

An exemplary WBALP 240 can include a markup language (ML) manipulator (MLM) 244. An exemplary MLM 244 can be capable of manipulating a received ML file, such as an HTML file, in order to pre-fetch future objects, add advertisements, combine several objects into multipart objects, etc. An exemplary VSALP 230 can include a video streaming manipulator (VSM) 234. An exemplary VSM 234 can be capable of manipulating a received stream of compressed video packets and may further compress the data, for example. Alternatively or additionally, an exemplary VSM 234 can be capable of adding advertisement to the video stream bandwidth management, etc. Another exemplary VSM 234 can be based on a media processor such as but not limited to the one that is made by SURF, LTD an Israeli company.

There is a plurality of patent applications, patents, and commercial products, such as the Flash Network NettGain product line, and Harmony product line, which manipulate payloads of packets traveling to and from the Internet. Therefore, the operation of the payload manipulator is not described in details. A reader who wishes to read more about payload manipulators is invited to read US patent applications such as: U.S. Ser. No. 11/686,495; U.S. Ser. No. 11/563,838; U.S. Ser. No. 11/462,355; U.S. Ser. No. 11/686,495; WO 2006/043,274 and many others.

In addition to the payload manipulator an exemplary ALP can comprise a message generator 242 or 232. The message generator can be adapted to the type of the ALP. The message generator can be capable of receiving information regarding the requester, connection information, etc. and then generate a message that can be added to the traffic that is transferred to the addressee of the call. For example, if the ALP is a WBALP 240, then an exemplary ML message generator MLMG 242 can be added. An exemplary MLMG 242 can create a pop-up message with the name of the requester and a link to a relevant application server 150 (FIG. 1) that is scheduled to host the communication session. The pop-up message is delivered to the MLM 244 to be added to a next page requested by the addressee of the call. Alternatively, the text message can be stored as a banner in an address in the shared memory 270 and, a browser link to the stored banner can be delivered to MLN 244 to be added to the next ML file that is directed toward the addressee. A browser link is a link to an object that is fetched automatically by a browser application while fetching a page such as a link for an image, for example.

If the addressee is involved in a video streaming session, a VSALP 230 could be associated with the addressee. A request to set a real-time communication session with the addressee can be delivered to a relevant VMG 232. An exemplary VMG 232 can be capable of decoding the video stream and, converting information regarding the requested session into video data. Non-limiting examples of such information may include the requester's name, the topic of the session (if one exist), and a URL for establishing the session. The video of the message can be placed over the decoded video stream. The combined video can be delivered toward the addressee via VSM 234, which can further process the combined stream. An exemplary VMG include bitmap insertion, video mixing, etc.

If the addressee is involved in instant messaging session, an IMALP could be associated with the addressee. A request to set a communication session with the addressee can be delivered to a relevant message generator to be converted into the format of an instant message to be sent toward the addressee. More information on the operation of the QoEIS 200 is disclosed below in conjunction with FIG. 3.

Figure 3:
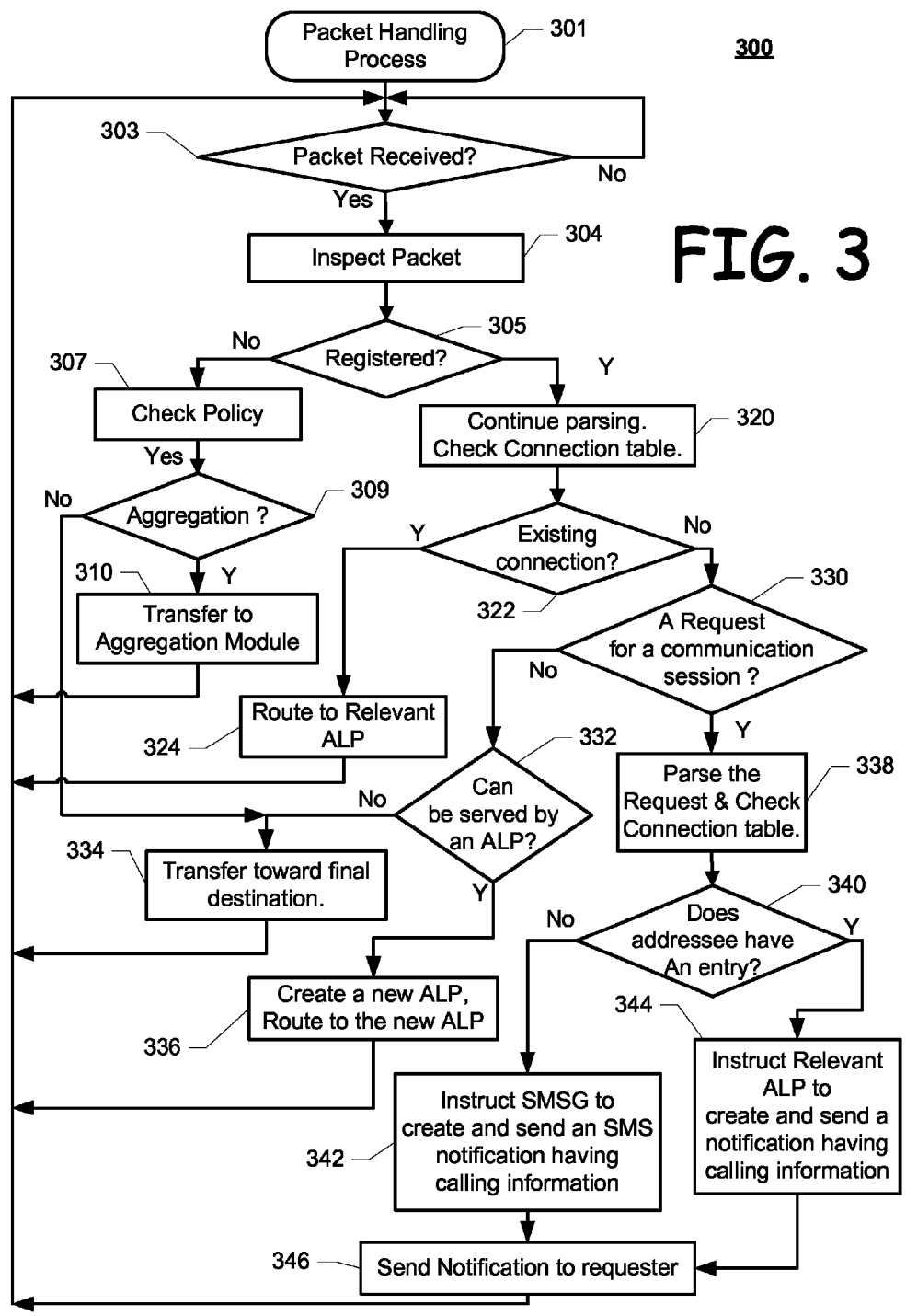
FIG. 3 illustrates a flowchart with relevant steps of an exemplary method that may be used for handling a received packet by an exemplary QoE improver server.

FIG. 3 illustrates a flowchart with relevant steps of an exemplary process 300 that can be used for handling a received packet. The process 300 can be implemented within the RME 220 (FIG. 2), for example. The process 300 is initialized 301 after power on, and may run in a loop as long as the QoEIS 200 is active. During the initialization 301, the RME 220 may get information on relevant resources, such as but not limited to its queues in the SM 270, queues of other modules, location of a served-users table, etc.

At step 303, the queue of the RME 220 (FIG. 2) is checked to determine if a packet to process has been received 303. For instance, in one embodiment of the invention the queue can be examined to determine if a pointer to a next packet exists. If such a pointer does not exist, the process 300 waits or loops back and rechecks the queue until a packet is received. If a packet has been received, the process 300 retrieves the packet and then analyzes 304 the packet in order to determine 305 whether the source and/or the destination of the received packet is a subscriber of the QoEIS 200 (i.e., is the source and/or destination registered). A subscriber can be a user 110 (FIG. 1) of the SPP 130 or a server such as one of the application servers 150.

If 305 the source and/or destination of the packet are/is not registered, a relevant policy from policy DB 290 (FIG. 2) can be considered 307 in order to determine how to serve the received packet. The decision with regards to how to serve the received packet can be based on the current load of the SPP 130, the time (day, night), the type of packet, the level of service, etc. As result, a decision is made 309 as to whether or not aggregation is to be performed. If the packet is to be aggregated, it is then transferred 310 to the aggregation module 260. Otherwise, the packet is transferred to the redirector 210 (FIG. 2) to be sent 334 toward its final destination. After transferring the packet, the process 300 returns to step 303 to wait for or to process the next packet.

Returning to step 305, if the source and/or the destination of the received packet is registered, then the packets can be further processed. This processing includes parsing the packet and comparing the connection information within the packet to the served-users table 320 in order to determine 322 whether the packet belongs to an existing connection. If an entry in the served-users table is found, then the packet is transferred 324 toward its relevant ALP and the process 300 returns to step 303 to wait on the arrival of the next packet. Routing the packet toward the relevant ALP can be based on the address in the shared memory 270 (FIG. 2) of the queue of the relevant ALP. The address of the queue can be stored in the associated entry.

If 322 the packet does not belong to an existing connection, the packet can be further parsed in order to determine 330 whether the packet is a request for a communication session. For instance, the packet may be a real-time session embedded text message, such as stocks, etc. Several algorithms can be used to determine if the packet is a request for a real-time session. An exemplary RME 220 can implement any combinations of the following examples or other algorithms. One algorithm may check whether the packet complies with one of the popular real-time protocols. Non-limiting examples of such real-time communication protocols include Session Initiation Protocol (SIP); Push-To-Talk Over Cellular (PTTOC), which is based on SIP, etc. Other algorithms for identifying the communication session may compare the destination address of the packet to a list of application servers 150 that are registered in the user IR 280. Other embodiments may use an invitation form for inviting an addressee to a real-time session. Embodiments of the present invention may use other algorithms for determining a request for a real-time communication session.

If 330 the packet does not include a real-time communication request, then a decision is made as to whether 332 the packet can be served by an ALP of the QoEIS 200. The decision can be based on the type of the packet. If 332 the packet cannot be served by the QoEIS 200, then the packet is transferred 334 toward its destination via redirector 210.

If 332 the packet can be served, then an appropriate ALP can be created and/or invoked 336, and further, an entry in the connection served-users table can be added. The entry can be associated with the source of the packet and relevant fields can be filled with information such as the source IP address, MS-ISDN, type of session, user's preferences, the address of the queue of the associated ALP in the shared memory 270, etc. The user's preferences can be retrieved from the IR 280. For example, if the packet is a request to fetch a page (an HTTP packet, for example), then a new WBALP 240 can be created.

Returning to step 330, if the packet includes a real-time communication request, the request is further parsed 338 and information about the addressee of the communication session is retrieved. The information about the addressee can be an IP address, an MS-ISDN, etc. Based on the addressee's information, the served-users table is searched for an entry that is relevant to the addressee. If 340 an entry is not found, then information about the addressee, the requester and type of session can be delivered 342 to the SMSG 250 (FIG. 2) with instruction to create an SMS message with the information on the call (the requester name, a URL for the session, etc.). The SMS with the MS-ISDN is sent to an associate SMSC to be delivered to the addressee of the requested session. A notification message can be created 346 informing the requester that an SMS message was sent to the addressee and the process 300 can return to step 303.

However, if 340 an entry is found, then information about the addressee, the requester and type of session can be delivered 344 to an ALP that is associated with the addressee with an instruction to create an exemplary invitation message with the information on the requested session call (the requester name, a URL for the session, etc.). Delivering the information to the ALP can accomplished by storing the information in the shared memory 270 and placing a pointer, pointing to the location of the information within the shared memory 270, in the queue of the relevant message generator (MLMG 242 or VMG 232, for example). The message generator will process the information according to the type of its associated ALP and the processed information can be delivered to the relevant manipulator (MLM 244 or VSM 234 respectively, for example) to be added to the information that is transferred to the addressee. After delivering the information to the message generator or to the addressee, a notification message can be created 346 informing the requester that a message was sent to the addressee and method 300 can return to step 303.

An alternate exemplary embodiment of the present invention may use a centralized message generator per each type of application. For example one central MLMG serving all MLM 244 and one central VMG serving all VSMs 234 (the central modules are not shown in the drawings).

Overall, this invention will improve the experience of a subscriber to establish an impromptu real-time communication session with an addressee by notifying the addressee about the request to communicate with him.

In the description and claims of the present application, each of the verbs, "comprise" "include" and "have", and conjugates thereof, are used to indicate that the object or objects of the verb are not necessarily a complete listing of members, components, elements, or parts of the subject or subjects of the verb.

In this application the words "unit" and "module" are used interchangeably. Anything designated as a unit or module may be a stand-alone unit or a specialized module. A unit or a module may be modular or have modular aspects allowing it to be easily removed and replaced with another similar unit or module. Each unit or module may be any one of, or any combination of, software, hardware, and/or firmware. Software can be embodied on a computer readable medium such as a read/write hard disc, CDROM, Flash memory, ROM, etc. In order to execute a certain task a software program can be loaded to an appropriate processor as needed. It will be appreciated that the above described modules may be varied in many ways, including, changing the number modules, and combining two or more modules into one. Dividing the operation of a certain module into two or more separate modules, etc.

It will be appreciated that the above described methods may be varied in many ways, including, changing the order of steps, and the exact implementation used. It should also be appreciated that the above described description of methods and apparatus are to be interpreted as including apparatus for carrying out the methods and methods of using the apparatus.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

What is claimed is:

1. A Quality of Experience (QoE) server that is located between a plurality of user terminals and a plurality of servers, the QoE server is configured to provide a notification available to a user, who is currently participating in a first communication session over an Internet Protocol (IP) network via the user terminal, the notification regarding a pending communication session based on the Internet Protocol wherein said user is the intended recipient of the pending communication session, the QoE server comprising:

a processing unit providing at least one notification message generator processor that receives information on the pending communication session over an IP network, identifies the application program that is serving the first communication session, and in response to this identification, parses the received information and creates a notification message that complies with a protocol of the identified application program which is currently being used in the first communication session by the intended recipient of the pending communication session;

a processing unit providing at least one manipulator in association with the at least one notification message processor configured to manipulate at least portions of the data transfer from a server out of the plurality of servers by embedding the notification message within data that is carried by packets associated with the application program and that is transferred toward the intended addressee, which servers participates in the first communication session, toward the intended recipient of the pending communication session to include the notification message; and a processing unit that provides an interface that intercepts data packets that are transferred between the plurality of users and the plurality of servers; parses the data packets; routes information on pending communication sessions to the at least one notification message generator processor; routes packets coming from the plurality of servers toward the at least one manipulator; and routes packets coming from the manipulator toward the plurality of users;

wherein the application program currently used in the first communication session can receive the notification message and render it to the intended recipient of the pending communication session while continuing in the first communication session.

2. The QoE server of claim 1, wherein the interface module is further configured to parse traffic associated with the first communication session to identify the application program.

3. The QoE server of claim 2, wherein the application program used in the first communication session by the intended recipient of the pending communication session is a browser, and the at least one notification message generator is further configured to create a markup language content notification message.

4. The QoE server of claim 2, wherein the application program used in the first communication session by the intended recipient of the pending communication session is a video stream player, and the at least one notification message generator is further configured to create a video content notification message.

5. The QoE server of claim 2, wherein the application program used in the first communication session by the intended recipient of the pending communication session is a messaging program, and the at least one notification message generator is further configured to create an injected text notification message.

6. The QoE server of claim 2, wherein the at least one notification message processor is further configured to create the notification message compatible with the application program used in the first communication session by creating content that can be rendered by the application program as content of the first communication session.

7. The QoE server of claim 1, wherein the pending communication is a real-time bi-directional communication session and, the at least one notification message generator is further configured to create a notification message by embedding instructions as to how to access the real-time bi-directional communication session.

8. The QoE server of claim 1, wherein the at least one notification message processor is configured to parse the received data packet of the pending communication session to identify a request to establish a communication session with the intended recipient.

9. The QoE server of claim 8, wherein the at least one notification message processor is further configured to create the notification message by including instructions on how to accept the request to establish a communication session.

10. A Quality of Experience (QoE) server that provides a pending communication session notification to an intended addressee, wherein the QoE server is installed in an intermediate node between a plurality of terminals and a plurality of servers, and wherein the communication between the terminals and the servers is carried over an Internet Protocol (IP) network, the apparatus comprising:
    a processing unit that provides the functionality of one or more content manipulators that manipulate data that is carried by packets associated with an application and that are carried over an IP network, and that are accessible by the QoE server;
    a processing unit that provides one or more notification message generators processors, each notification message generator processor being associated with at least one of the content manipulators and creates a notification message that complies with a protocol of the data that is manipulated by the associated one or more content manipulators;
    wherein the associated notification message generator processor creates a notification message, which is delivered to the associated content manipulator to be embedded within data that is carried by packets associated with the application and that is transferred toward the intended addressee; and
    wherein the intended addressee of the pending communication session is currently participating in a first communication over the IP network.

11. The QoE server of claim 10, further comprising:
    a routing and management module that:
        i. receives packets that are transferred between the plurality of terminals and the plurality of servers;
        ii. analyzes a request contained in one or more packets for establishing the pending communication session between an initiator and the intended addressee and obtaining information about the pending communication session including the identity of the intended addressee; and
        iii. transfers the information about the pending communication session to a notification message processor that is associated with the content manipulator that is associated with the intended addressee of the requested communication session.

12. A method for providing a communication notification to an intended addressee of a pending communication session, the intended addressee currently participating in a first communication session, wherein the first communication session and the pending communication sessions are based on the Internet Protocol (IP), the method comprising the steps of:
    receiving, at a processor that is located in an intermediate node between a plurality of terminals and a plurality of servers, packets that are transferred between the plurality of terminals and the plurality of servers over an IP network;
    the receiving processor parsing the received packets;
    the receiving processor identifying in the received packets a request for establishing the pending communication;
    the receiving processor analyzing the request to collect information about the pending communication session;
    the receiving processor identifying an application that is being utilized in the first communication session;
    in response to identifying the application that is being utilized in the first communication session, the receiving processor creates a notification message that is compatible for rendering through the identified application by embedding the notification message within data that is carried by packets associated with the application and that is transferred toward the intended addressee, wherein the notification message includes information about the pending communication session; and
    the receiving processor sending the notification message toward the intended addressee over an IP network as content of the first communication session.

13. The method of claim 12, wherein the identified application is involved in fetching markup language files, and the act of creating a notification message further comprises the step of including an object within a next requested markup language file.

14. The method of claim 13, wherein the step of including an object within the next requested markup language file further comprises including a popup message.

15. The method of claim 12,
    wherein the act of creating a notification message further comprises embedding the notification message within the content that is handled by the application.

16. The method of claim 12,
    wherein the act of creating a notification message further comprises including instructions regarding how to access the pending communication.

* * * * *